United States Patent Office 2,910,368
Patented Oct. 27, 1959

2,910,368

VEGETABLE SALAD AND METHOD FOR PRODUCING SAME

Daniel Melnick, Teaneck, N.J., George A. Perry, Elmhurst, N.Y., and Jack Akerboom, Lincroft, Middletown Township, Monmouth County, N.J., assignors to Corn Products Company, a corporation of Delaware No Drawing. Application October 18, 1957
Serial No. 690,915

13 Claims. (Cl. 99—154)

This invention relates to a novel vegetable salad and to the method of preparing the same and, more particularly, it is concerned with a novel vegetable salad having exceptional stability in regard to flavor and freedom from spoilage.

This application is a continuation-in-part of Serial No. 679,107, filed August 19, 1957, now abandoned, which in turn is a continuation-in-part of Serial No. 670,628, filed July 9, 1957.

Micro-organisms can cause poisoning and impairment of appearance and flavor of vegetable salads. The harmless kind of micro-organisms such as fungi and yeast can cause poor flavor and appearance in the salads. Food poisoning may be caused by such bacteria as Clostridium, Salmonella, Streptococcus and Staphylococcus. Certain types of the Clostridium will impart to food a putrid odor, thus warning the consumer that the food product is contaminated. On the other hand, Salmonella, Streptococcus and Staphylococcus may not be detected by the consumer even when present in dangerous concentrations. Vegetable salads are very susceptible to microbiological growth because they furnish an excellent environment in which the microorganisms can grow.

From the time of manufacture to the time of consumption, vegetable salads are maintained in constant refrigeration storage to prevent undue growth of micro-organisms. In the marketing of such material, the maximal shelf life is about 11 to 12 days. The short life necessitates restricted distribution to an area within a reasonable distance from the manufacturing center. The care required in the handling of vulnerable foods is illustrated by the fact that about 5 hours at room temperature is sufficient to permit food poisoning bacteria to grow in some foods to the point at which it is dangerous for the public to consume the food. If extraordinary care is taken to refrigerate the salads at all times just above the freezing point, the shelf life may be extended from the standpoint of resistance to the growth of the food poisoning micro-organisms. However, this practice is not adequate by itself because the flavor of the vegetable salad deteriorates before the end of the extended period.

As mentioned, a vegetable salad will not retain an acceptable flavor over a period longer than about 2 weeks. Off-flavor occurs even though special care has been taken to keep the vegetable salad refrigerated at all times. At times, off-flavor will take place while the appearance of the salad will remain good. All of these happenings point to the incomplete state of our knowledge regarding matters of spoilage. In view of the importance of this subject matter, work was done to learn more about the factors involved. During the course of this work, we have discovered quite unexpectedly an effective and economical way of improving the shelf life of vegetable salads.

Thus, an object of this invention is to provide a novel vegetable salad having unusual shelf life in regard to flavor, appearance and safety for human consumption.

Another object of this invention is to provide a method of preparing a vegetable salad by which the shelf life of the salad is improved markedly over conventional salads being sold on the market today.

Other objects and advantages will become apparent from the following description and explanation thereof.

In accordance with this invention, the vegetable salad comprises about 15 to 60% by weight of a solid vegetable component containing about 0.0004 to 2% by weight of ethylenediaminetetraacetic acid component and about 0.1 to 2.5% by weight of acetic acid, and about 40 to 85% by weight of a dressing containing about 0.1 to 2.5% acetic acid. The dressing component of the salad may also contain ethylenediaminetetraacetic acid component in the amount specified for the vegetable component. The shelf life of the vegetable salad can be further improved by the additional presence of a fungistat of the type to be described in greater detail hereinbelow. The pH of the vegetable salad is controlled at about 3 to 6.

All references in this specification to the quantity of the solid vegetable components in the vegetable salads of this invention are based upon the weight of the vegetables in their natural hydrated state or of the dehydrated vegetables subsequent to rehydration.

The ethylenediaminetetraacetic acid component is present in either of the vegetable component or dressing component in an amount of about 0.0004 to 2% by weight and preferably about 0.004 to 0.2% by weight. The ethylenediaminetetraacetic acid component cooperates in a unique manner with acetic acid to improve the shelf life of the vegetable salad from the standpoint of appearance, flavor and safety in consumption. The manner in which the cooperation between the acetic acid and the ethylenediaminetetraacetic acid component takes place is not understood except it is noted that the absence of one reduces the shelf life of the vegetable salad to a level far below that expected on the basis of the summation of effects of each material. The expression "ethylenediaminetetraacetic acid component" is intended to be generic to the free acid and its edible mono-, di-, tri-, or tetra-salt, where the salt-forming radical is a metallic cation which is edible and includes sodium, potassium or calcium, either alone or combinations thereof.

The acetic acid is preferably introduced into the vegetable salad in the form of vinegar. The amount of vinegar employed for this purpose is determined on the basis of the acetic acid content, and so generally the vegetable component and dressing component of the salad contain about 0.1 to 2.5% acetic acid and preferably about 0.25 to 1.5% on the same basis. The quantity of acetic acid is measured on a weight basis. The amount is regulated to obtain a pH of about 3 to 6 in the finished salad and preferably about 3.2 to 5. Acetic acid being both an organic free-carboxylic acid and a saturated low aliphatic acid also exhibits fungistatic activity. Here also the value of the salt in the dressings in augmenting this fungistatic activity is well known.

While the acetic acid and ethylenediaminetetraacetic acid component synergize and thus improve the shelf life of the vegetable salad, it is also found that the shelf life of some of our salads can be further improved by the additional presence of a fungistat. The fungistat may be present in either the vegetable component or the dressing component, or both, in an amount of about 0.015 to 0.3% by weight and preferably about 0.05 to 0.15% on the same basis. As fungistatic agent we may use a variety of compounds such as the certain organic free-carboxylic acids and their alkyl esters, and their edible salts wherein the alkyl radical contains 1 to 5 carbon atoms, e.g. methyl, ethyl and propyl groups, and the edible alkali-metal and alkaline earth metal salts include the sodium, potassium, magnesium and calcium salts. Included among these carboxylic acids are the saturated lower aliphatic acids, including propionic and diacetic acids and the alpha-beta unsaturated carboxylic acids of the following formula:

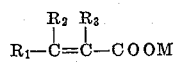

wherein that portion of the molecule containing the alpha-beta unsaturation may be either an aliphatic group or part of an aromatic ring. Where more than one unsaturated carbon to carbon linkage exists in the molecule, such unsaturation is part of a conjugated double bond system with alpha-beta carbon to carbon unsaturation. In the formula above, $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen atoms or alkyl groups and M is selected from an edible metallic cation, hydrogen and an alkyl group containing 1 to 5 carbon atoms. Examples of such acids are: crotonic, isocrotonic, beta-ethylacrylic, dimethylacrylic, alpha-hexenoic, sorbic, benzoic and parahydroxybenzoic acids, etc. The aliphatic compounds containing the alpha-beta unsaturation are preferred for this invention. For the purpose of this specification and the appended claims, an organic carboxylic acid component includes generically the free acid, the alkyl esters and the edible soluble metal salts thereof, as limited hereinabove in regard to the alkyl group and the metallic cation.

It is found that in salads containing more than about 60% by weight of solid vegetable components a fungistat should be used in order to improve shelf life significantly. In the case of other salads, such as vegetable salads, having not more than 60% of solid vegetable components, it is found that shelf life can be satisfactory without the additional presence of a fungistat. In salads containing high concentrations of solid vegetable components, it is difficult for the acetic acid or ethylenediaminetetraacetic acid component to migrate from dressing into solid vegetable, and when migration finally comes to equilibrium, the level of concentration of additives would be below that needed for good performance through the early phase of shelf life or storage. This defect can be overcome by the use of unusually high concentrations of the two acid additives in the dressing component, however, at such high concentrations the dressing component is not palatable and so this approach to the problem cannot be used.

The vegetable component in the salad is, for example, onion, green pepper, red pepper, celery stalk, carrot, cabbage and the like or mixtures thereof. The vegetable component is diced or chopped for use in the salad. The raw vegetable is not easily penetrated by the additives of this invention. Cooking the vegetable changes the structural character and makes possible easy penetration of the additives, e.g. ethylenediaminetetraacetic acid component and the acetic acid. However, cooking causes the vegetable to lose crispness and the desirable native flavor of the food. Consequently, in the practice of this invention it is preferred that the chopped vegetable be first blanched for the purpose of enzyme inactivation and then dehydrated. In the dehydrated state the vegetable component readily reabsorbs water and the additives will be distributed as desired, i.e., in a substantially uniform manner throughout the vegetable. In the preparation of the salad the dehydrated vegetable is rehydrated or reconstituted in a solution of ethylenediaminetetraacetic acid component and acetic acid with or without a fungistat. In the rehydration step the vegetable is kept in contact with the liquor for a period of about 2 to 20 hours or until the vegetable rehydrates to that point at which it weighs about 35 to 80% of that prior to the dehydration. Usually about 5 to 25 parts by weight of rehydrating solution per part by weight of dehydrated vegetable are used for this purpose. Salt may also be used in the rehydrating liquor in an amount of about 0.1 to 3.0% by weight. Partial rehydration of the vegetable is desired because the vegetable retains a crispness which is apparent throughout the entire shelf life of the finished product, for example, for a period of up to about 1½ months at room temperature or up to about 4 months under refrigeration conditions. In the rehydration step the treating solution contains the ethylenediaminetetraacetic acid component, acetic acid and fungistat in the amount desired in the vegetable component. Rehydration is effected preferably at ambient temperatures or in general at a temperature of about 35° to about 95° F.

In accordance with this invention, the subdivided vegetables contain an ethylenediaminetetraacetic acid component and acetic acid distributed evenly, i.e. in a substantially uniform manner, through each solid food component and the acetic acid with or without the ethylenediaminetetraacetic acid component is also distributed in a substantially uniform manner through the dressing portion. The ethylenediaminetetraacetic acid component is a mandatory ingredient in the processed vegetables and a preferred but optional ingredient in the dressing. When there is even distribution of these protective agents through the components of the salads, we mean that the concentrations of these agents in each of the components are substantially uniform throughout that component but the concentration in each of the solid components need not be the same and these may differ from those in the dressing component.

The dressing component of the vegetable salad comprises about 40 to about 85% by weight of the finished salad. The dressing includes, for example, mayonnaise, salad dressing, French dressing or any combination of oil and vinegar, with or without added sugar, salt and other flavor components. Mayonnaise is an emulsified semi-solid food prepared from edible vegetable oil, an acidifying ingredient and an egg-yolk-containing material. It usually contains from about 65 to 80% vegetable oil, about 0.15 to 0.7% vinegar measured as acetic acid and about 4 to 10% liquid egg-yolk. Flavoring agents, including spices, salt and sugar, may also be added. Salad dressing contains, in addition to the components enumerated for mayonnaise, a cooked or partly cooked starchy paste. Salad dressing usually contains from about 30 to about 50% vegetable oil, about 0.5 to 2.0% vinegar measured as acetic acid and about 4 to 7% liquid egg-yolk. Flavoring agents such as spices, salt and sugar may also be included. French dressing is an emulsified viscous fluid food prepared from edible vegetable oil and an acidifying ingredient. It usually contains about 35 to 70% vegetable oil and about 0.5 to 2.0% vinegar measured as acetic acid. The flavoring agents mentioned above may also be included. The emulsifying agent in French dressing is usually a vegetable gum and it is employed in an amount of about .15% to about 0.75%. The ethylenediaminetetraacetic acid component may be added to the dressing at any time, e.g. the same time that vinegar is added, or the component can be added to the finished dressing. The only important factor is that it is mixed under conditions to obtain uniform or substantially uniform distribution through the dressing.

The stabilized products of this invention are vegetable salads used as a filling in sandwiches, as a "dip" for potato chips and crackers, and as a dressing in the home in preparing potato, macaroni, meat, fish and egg salads and cole slaw.

In order to provide a better understanding of this invention, reference will be had to the following specific examples:

EXAMPLE I.—Ingredient

| Dressing component: | Parts by weight |
|---|---|
| Mayonnaise | 50.036 |
| Starch base— | |
|     Flour | 2.0 |
|     Cornstarch | 0.4 |
|     Liquor drained from rehydrated chopped vegetables | 7.1 |
|     Water | 3.7 |
|     Sugar | 3.1 |
|     Salt | 1.7 |
|     Vinegar (100 gr. spirit) | 5.0 |
|     Disodium calcium ethylenediaminetetraacetate | 0.014 |
| Total | 73.050 |

| Vegetable component (rehydrated basis): | |
|---|---|
| Celery | 6.90 |
| Red and green sweet pepper | 10.05 |
| Onion | 10.00 |
| Total | 26.95 |
| Grand total | 100.00 |

The dehydrated chopped vegetables were reconstituted or rehydrated in 6.5 parts of a liquor of the following composition per 1 part of the vegetables at 45° F. for a period of 2 hours.

*Reconstitution liquor for chopped vegetables*

| | |
|---|---|
| Water | 93.97 |
| Vinegar (100 gr. spirit) | 4.02 |
| Salt | 2.00 |
| Disodium calcium ethylenediaminetetraacetate | 0.01 |
| Total | 100.00 |

Following the reconstitution period, the chopped vegetables were drained, the excess liquor being reserved for the dressing component.

The starch base of the dressing component was prepared by blending the flour, cornstarch, sugar, salt and the soluble salt of ethylenediaminetetraacetic acid with the vegetable liquor, water and vinegar in a cooking kettle. This mixture was heated and agitated to 195° F. for a period of 5 minutes and then cooled to 90° F. The mayonnaise, prepared starch base and drained rehydrated vegetables were then combined and blended, after which the product was filled into containers and refrigerated at 45° F.

The product contains a total of 0.017% of the ethylenediaminetetraacetic acid component and 0.8% of acetic acid. The chopped vegetable components after rehydration weighed 46% of that prior to dehydration. For full reconstitution to the original raw vegetable state, it would have required the absorption of 10½ parts of liquor by each part of the mixed dehydrated vegetable components. This product when stored in the refrigerator at about 45° F. showed no evidence of microbiological spoilage or flavor deterioration for a period of more than 16 weeks, and throughout this holding period the vegetable components had desirable crispiness.

EXAMPLE II

This is the same as Example I but there was no addition of the ethylenediaminetetraacetic acid component to the dressing. Instead, the concentration of the ethylenediaminetetraacetic acid component in the reconstitution liquor for the vegetables was increased threefold to 0.03%. Thus, the salad and product contained the same concentration of acetic acid as Example I but only 0.010% of the ethylenediaminetetraacetic acid component. The vegetable salad when stored in the refrigerator at about 45° F. showed no evidence of microbiological spoilage or flavor deterioration for a period of more than 16 weeks, and throughout this holding period the vegetable components had desirable crispiness.

EXAMPLE III.—Ingredient

| Dressing component: | Parts by weight |
|---|---|
| Mayonnaise | 37.019 |
| Starch base— | |
|     Flour | 1.64 |
|     Cornstarch | 0.33 |
|     Liquor drained from rehydrated chopped vegetables | 5.83 |
|     Sugar | 2.55 |
|     Salt | 1.40 |
|     Vinegar (100 gr. spirit) | 8.99 |
|     Sorbic acid | 0.036 |
|     Ethylenediaminetetraacetic acid | 0.005 |
| Total | 57.800 |

| Vegetable component (rehydrated basis): | |
|---|---|
| Celery | 12.1 |
| Red and green sweet peppers | 15.1 |
| Onion | 15.0 |
| Total | 42.2 |
| Grand total | 100.00 |

The dehydrated chopped vegetables were reconstituted in seven parts of a liquor of the following composition per one part of the vegetables at 50° F. for a period of 20 hours.

*Reconstitution liquor for chopped vegetables*

| | |
|---|---|
| Water | 93.77 |
| Vinegar (100 gr. spirit) | 4.02 |
| Salt | 2.00 |
| Sorbic acid | 0.20 |
| Ethylenediaminetetraacetic acid | 0.01 |
| Total | 100.00 |

Following the reconstitution period, the chopped vegetables were drained, the excess liquor being reserved for the dressing component.

The starch base of the dressing component was prepared by blending the flour, cornstarch, sugar, salt, sorbic acid and the ethylenediaminetetraacetic acid with the vegetable liquor and vinegar in a cooking kettle. This mixture was heated with agitation to 195° F. for a period of 5 minutes and then cooled to 90° F. The mayonnaise, prepared starch base and drained rehydrated vegetables were then combined and blended, after which the product was filled into containers and refrigerated at 45° F.

This product contains a total of 0.01% of ethylenediaminetetraacetic acid, 1.2% of acetic acid, and 0.1% of sorbic acid. The vegetable components after rehydration weighed 50% of that prior to dehydration. For full reconstitution to the original raw vegetable state, it would require the absorption of 10½ parts of liquor by each part of the mixed dehydrated vegetable components. This product when stored in the refrigerator at about 45° F. was free of microbiological spoilage, was free of flavor deterioration for a period of more than 16 weeks, and throughout this holding period the vegetable components had desirable crispiness.

EXAMPLE IV.—Ingredient

| Dressing component: | Parts by weight |
|---|---|
| Mayonnaise | 36.996 |
| Starch base— | |
|     Flour | 2.00 |
|     Cornstarch | 0.40 |
|     Liquor drained from rehydrated chopped vegetables | 7.10 |
|     Sugar | 3.10 |
|     Salt | 1.70 |
|     Vinegar (100 gr. spirit) | 15.00 |
|     Ethylenediaminetetraacetic acid | 0.014 |
|     Total | 66.310 |

| Vegetable component (rehydrated basis): | |
|---|---|
| Celery | 8.63 |
| Red and green sweet peppers | 12.56 |
| Onion | 12.50 |
|     Total | 33.690 |
|     Grand total | 100.00 |

The dehydrated chopped vegetables were reconstituted in about eight parts of a liquor of the following composition per one part of the vegetable meats at 60° F. for a period of 20 hours.

*Reconstitution liquor for chopped vegetables*

| Water | 93.97 |
|---|---|
| Vinegar (100 gr. spirit) | 4.02 |
| Salt | 2.00 |
| Ethylenediaminetetraacetic acid | 0.01 |
|     Total | 100.00 |

Following the reconstitution period, the chopped vegetables were drained, the excess liquor being reserved for the dressing component.

The starch base of the dressing component was prepared by blending the flour, cornstarch, sugar, salt and the ethylenediaminetetraacetic acid with the vegetable liquor and vinegar in a cooking kettle. This mixture was heated with agitation to 195° F. for a period of 5 minutes and then cooled to 90° F. The mayonnaise, prepared starch base and drained rehydrated vegetables were then combined and blended, after which the product was filled into containers and stored at room temperature.

This product contains a total of 0.017% of ethylenediaminetetraacetic acid component and 1.8% of acetic acid. The vegetable components after rehydration weighed about 60% of that prior to dehydration. For full reconstitution to the original raw vegetable state, it would require the absorption of 10½ parts of liquor by each part of the mixed dehydrated vegetable components. This product when stored at room temperature (70° F.) was free of microbiological spoilage, free of flavor deterioration for a period of about 6 weeks, and throughout this holding period the vegetable components were still surprisingly crisp.

EXAMPLE V.—Ingredient

| Dressing component: | Parts by weight |
|---|---|
| Mayonnaise | 32.00 |
| Starch base— | |
|     Flour | 1.48 |
|     Cornstarch | 0.30 |
|     Liquor drained from vegetable meats | 5.24 |
|     Sugar | 2.28 |
|     Salt | 1.25 |
|     Vinegar (100 gr. spirit) | 7.41 |
|     Benzoic acid | 0.03 |
|     Disodium calcium ethylenediaminetetraacetate | 0.01 |
|     Total | 50.00 |

| Vegetable component (rehydrated basis): | |
|---|---|
| Cabbage | 20.0 |
| Green sweet peppers | 15.0 |
| Carrots | 10.0 |
| Onion | 5.0 |
|     Total | 50.0 |
|     Grand total | 100.00 |

The dehydrated vegetable meats were reconstituted in seven parts of a liquor of the following composition per one part of the vegetable meats at 50° F. for a period of 20 hours.

*Reconstitution liquor for vegetable meats*

| Water | 93.77 |
|---|---|
| Vinegar (100 gr. spirit) | 4.02 |
| Salt | 2.00 |
| Benzoic acid | 0.20 |
| Disodium calcium ethylenediaminetetraacetate | 0.01 |
|     Total | 100.00 |

Following the reconstitution period, the vegetable meats were drained, the excess liquor being reserved for the dressing component.

The starch base of the dressing component was prepared by blending the flour, cornstarch, sugar, salt, benzoic acid and the soluble salt of ethylenediaminetetraacetic acid with the vegetable liquor and vinegar in a cooking kettle. This mixture was heated with agitation to 195° F. for a period of 5 minutes and then cooled to 90° F. The mayonnaise, prepared starch base and drained rehydrated vegetable meats were then combined and blended, after which the product was filled into containers and refrigerated at 45° F.

This product contains a total of about 0.015% of the ethylenediaminetetraacetic acid component, 1.0% of acetic acid and 0.1% of benzoic acid. The vegetable components after rehydration weighed 70% of that prior to dehydration. For full reconstitution to the original raw vegetable state, it would require the absorption of 10½ parts of liquor by each part of the mixed dehydrated vegetable components. This product, stored in the refrigerator at about 45° F. was free of microbiological spoilage of flavor deterioration for a period of more than 16 weeks, and throughout this holding period the vegetable components had desirable crispiness.

EXAMPLE VI.—Ingredient

| Dressing component: | Parts by weight |
|---|---|
| Mayonnaise | 51.09 |
| Vinegar (100 gr. spirit) | 15.00 |
| Sugar | 2.50 |
| Salt | 1.40 |
| Ethylenediaminetetraacetic acid | 0.01 |
|     Total | 70.00 |

| Vegetable component: | |
|---|---|
| Fresh chopped cooked onion | 12.5 |
| Fresh chopped cooked green sweet pepper | 11.2 |
| Fresh chopped cooked carrots | 6.3 |
|     Total | 30.0 |
|     Grand total | 100.00 |

The chopped fresh vegetables were boiled for a 3 minute period in two parts of a liquor of the following composition per one part of vegetables.

*Cooking liquor for fresh vegetables*

| | |
|---|---|
| Water | 93.98 |
| Vinegar (100 gr. spirit) | 4.0 |
| Salt | 2.0 |
| Ethylenediaminetetraacetic acid | 0.02 |
| Total | 100.00 |

Following the cooking period, the vegetables were drained and air cooled to 70° F. The dressing component was prepared by adding the vinegar, sugar, salt and ethylenediaminetetraacetic acid thereto. The dressing and vegetable meats were then combined, blended and refrigerated at 45° F.

This product contains a total of about 0.01% of ethylenediaminetetraacetic acid and about 1.7% of acetic acid. The product when stored in the refrigerator at 45° F. was free of microbiological spoilage, and free of flavor deterioration for a period of 10 weeks. The vegetable flavor in this product was less intense than that of the products of the prior examples and the chopped vegetables were less crisp. This example describes one of the less preferred products of this invention.

EXAMPLE VII

One part of catsup is added to four parts of the finished product of Example I to make what is commonly referred to as Thousand Island or Russian dressing.

EXAMPLE VIII

One part of catsup is added to four parts of the finished product of Example II to make what is commonly referred to as Thousand Island or Russian dressing.

In our copending parent application, Serial No. 670,663, filed July 9, 1957, various auxiliary additives are mentioned for use in combination with a fungistat and an acidifying agent for preservation of foods, particularly food salads. The amino polycarboxylic acid component (including the acid and the edible mono-, di-, tri- and tetra salts of sodium, potassium and calcium) represents the genus of the ethylenediaminetetraacetic acid component herein. The genus includes such compounds as ethylenediaminetetrapropionic acid or the edible salts thereof, propylenediaminetetraacetic acid or the edible salts thereof, propylenediaminetetrapropionic acid or the edible salts thereof, ethylenediaminediaceticdipropionic acid or the edible salts thereof, etc. While the described amino polycarboxylic acid components are useful for the purposes set forth in Serial No. 670,663, and thus the entire disclosure of the same is incorporated herein by reference for adaptation of the described amino polycarboxylic acid components thereto, we find that ethylenediaminetetraacetic acid component is more effective for the purposes of this invention as well as for the purpose in the parent case than the other amino polycarboxylic acid components described above. The amino polycarboxylic acid components described above can be used with either a fungistat alone, an edible acid alone or with both an acid and a fungistat.

Having thus provided a written description along with specific examples of our invention, it should be understood that no undue limitations or restrictions are to be imposed by reason thereof but that the present invention is defined by the appended claims.

We claim:

1. A vegetable salad comprising about 15 to 60% of subdivided solid vegetable component, said vegetable component containing about 0.1 to 2.5% of acetic acid and about 0.0004 to 2% of ethylenediaminetetraacetic acid component distributed evenly therethrough, and about 40 to 85% of an edible dressing containing about 0.1 to about 2.5% acetic acid, said salad having a pH of about 3 to 6.

2. A vegetable salad comprising about 15 to 60% of subdivided solid vegetable component, said vegetable component containing about 0.1 to 2.5% of acetic acid and about 0.0004 to 2% of ethylenediaminetetraacetic acid component distributed evenly therethrough, and about 40 to 85% of an edible dressing containing about 0.1 to 2.5% acetic acid and about 0.0004 to 2% of ethylenediaminetetraacetic acid component, said salad having a pH of about 3 to 6.

3. A vegetable salad comprising about 15 to 60% of subdivided solid vegetable component, said vegetable component containing about 0.25 to 1.5% acetic acid and about 0.004 to 0.2% of ethylenediaminetetracetic acid component distributed evenly therethrough, and about 40 to 85% of an edible dressing containing about 0.25 to 1.5% acetic acid, said salad having a pH of about 3.2 to 5.

4. The salad of claim 3 being further characterized by the dressing containing additionally about 0.004 to 0.2% of ethylenediaminetetraacetic acid component.

5. The vegetable salad of claim 1 in which the ethylenediaminetetraacetic acid component is ethylenediaminetetraacetic acid.

6. The vegetable salad of claim 1 wherein the ethylenediaminetetraacetic acid component is disodium calcium ethylenediaminetetraacetate.

7. A vegetable salad comprising about 15 to 60% of subdivided vegetables including celery, red sweet peppers, green sweet peppers, and onion, said vegetables containing about 0.1 to about 2.5% acetic acid and about 0.0004 to 2% of ethylenediaminetetraacetic acid component distributed evenly therethrough, and about 40 to 85% mayonnaise containing about 0.15 to 0.7% acetic acid, said salad having a pH of about 3 to 6.

8. A vegetable salad comprising about 15 to 60% of subdivided vegetables selected from the group consisting of onions, green sweet peppers, red sweet peppers, celery stalks, carrots and cabbage, said vegetables containing about 0.1 to 2.5% acetic acid and about 0.0004 to 2% of ethylenediaminetetraacetic acid component distributed evenly therethrough, and about 40 to 85% of an edible dressing selected from the group consisting of mayonnaise, salad dressing and French dressing, said dressing containing about 0.1 to 2.5% acetic acid, and said salad having a pH of about 3 to 6.

9. A vegetable salad comprising about 15 to 60% of subdivided vegetables including cabbage, green sweet peppers, carrots and onion, said vegetables containing about 0.1 to 2.5% acetic acid and about 0.0004 to 2% of ethylenediaminetetraacetic acid component distributed evenly therethrough, and about 40 to 85% mayonnaise containing about 0.15 to 0.7% acetic acid, said salad having a pH of about 3 to 6.

10. A method of preparing a vegetable salad which comprises contacting a dehydrated vegetable component with water containing about 0.1 to 2.5% acetic acid and about 0.0004 to 2% ethylenediaminetetraacetic acid component for a period of about 2 to 20 hours and thereby rehydrating the vegetable component until its weight is about 35 to 80% of that prior to the dehydration, separating the vegetable component from said water solution and combining the separated vegetable with a dressing containing about 0.1 to 2.5% acetic acid.

11. The process of claim 10 being further characterized by combining the separated vegetable with a dressing containing about 0.1 to 2.5% acetic acid and about 0.0004 to 2% of ethylenediaminetetraacetic acid component.

12. A method of preparing a vegetable salad which comprises cooking a subdivided vegetable in its natural hydrated state with water containing about 0.1 to 2.5% acetic acid and about 0.0004 to 2% of ethylenediaminetetraacetic acid component for a period sufficient at least to inactivate enzymes in the vegetable and to distribute evenly the two acid components through the vegetable, and then combining the cooked vegetable with a dressing containing about 0.1 to 2.5% acetic acid.

13. The process of claim 12 being further characterized by combining the cooked vegetable with a dressing containing about 0.1 to 2.5% acetic acid and about 0.0004 to 2% of ethylenediaminetetraacetic acid component.

References Cited in the file of this patent

UNITED STATES PATENTS

| | | |
|---|---|---|
| 1,318,174 | Plaisance | Oct. 7, 1919 |
| 1,889,123 | Jones | Nov. 29, 1932 |
| 2,371,623 | Henderson | Mar. 20, 1945 |
| 2,463,015 | Bersworth | Mar. 1, 1949 |